C. B. DALZELL.
CENTRIFUGAL TESTING MACHINE.
APPLICATION FILED OCT. 26, 1918.

1,321,288.

Patented Nov. 11, 1919.
2 SHEETS—SHEET 1.

INVENTOR.
Charles B. Dalzell,
by Wilhelm Parker
ATTORNEYS.

C. B. DALZELL.
CENTRIFUGAL TESTING MACHINE.
APPLICATION FILED OCT. 26, 1918.

1,321,288.

Patented Nov. 11, 1919.
2 SHEETS—SHEET 2.

INVENTOR.
Charles B. Dalzell,
by Wilhelm & Parker
ATTORNEYS.

UNITED STATES PATENT OFFICE.

CHARLES B. DALZELL, OF LITTLE FALLS, NEW YORK, ASSIGNOR TO D. H. BURRELL & CO., OF LITTLE FALLS, NEW YORK.

CENTRIFUGAL TESTING-MACHINE.

1,321,288.

Specification of Letters Patent.

Patented Nov. 11, 1919.

Application filed October 26, 1918. Serial No. 259,827.

*To all whom it may concern:*

Be it known that I, CHARLES B. DALZELL, a citizen of the United States, residing at Little Falls, in the county of Herkimer and State of New York, have invented a new and useful Improvement in Centrifugal Testing-Machines, of which the following is a specification.

This invention relates more particularly to improvements in centrifugal liquid testing machines or centrifuges of the types used for determining the percentage of butter fat in milk and cream, in which the liquid to be tested is put in bottles or containers which are whirled in a rotating carrier to cause the separation of the fat from the liquid by centrifugal action.

In the use of these centrifuges for testing milk and cream, as is well known, a mixture of the milk or cream and sulfuric acid is placed in the test bottles and shaken until all curd has disappeared. The bottles are then placed in the rotary carrier and whirled at the proper speed for a predetermined period of time. Then the bottles are filled to the base of the necks with hot water of suitable temperature, usually about 140°, and whirled again. Thereafter the bottles are filled nearly to the tops of their graduated necks and then given a final whirl for a definite period of time. It is necessary, in making the tests, to maintain a suitable temperature in the testers, so that the butter fat which, due to the centrifugal action, moves into the inwardly directed necks of the bottles, shall not be cooled off to a point which will affect the result and prevent a correct reading. It has been customary in centrifuges of the steam turbine type to maintain the temperature by allowing a small amount of steam to enter the inclosing casing of the centrifuges during the test. In the use of other types of machines where steam is not available, hot water has been put into the tester casing or a lamp or other heating device placed under the body of the tester to maintain the temperature. While more or less accurate results have been obtained in these ways they are not convenient or satisfactory ways of maintaining the temperature. In the case of hand and motor-driven testers, steam is not always available, or if available it may be inconvenient for one reason or another to use the steam for heating the tester. It is inconvenient for obvious reasons to use hot water in the tester casing or to heat the casing by means of external devices.

The object of this invention is to overcome these difficulties and provide efficient, practical and convenient means of simple construction for properly maintaining the temperature in centrifugal testers.

As above indicated, hot water is used in the bottles in running the test and in accordance with this invention a water heater of convenient type is preferably provided both for supplying such hot water, and for maintaining the required temperature in the tester during the test. This water heater is also preferably so disposed with reference to the tester that the hot water can be conveniently discharged therefrom into the test bottles without removing them from the tester.

Figure 1:
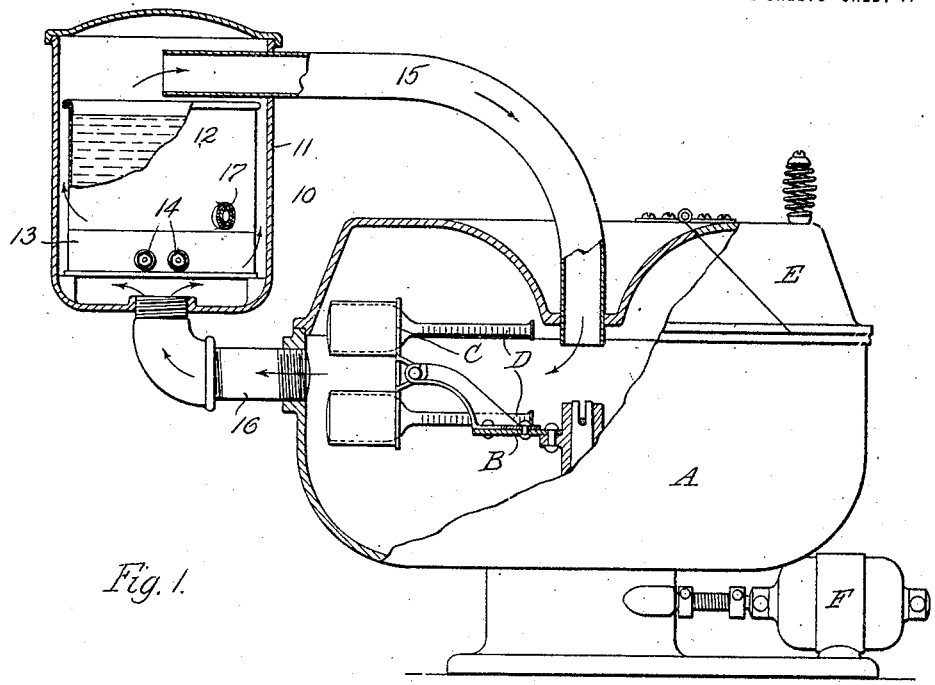
Figure 1 is an elevation, partly in section, of a centrifuge and heater embodying the invention.
Figure 2:
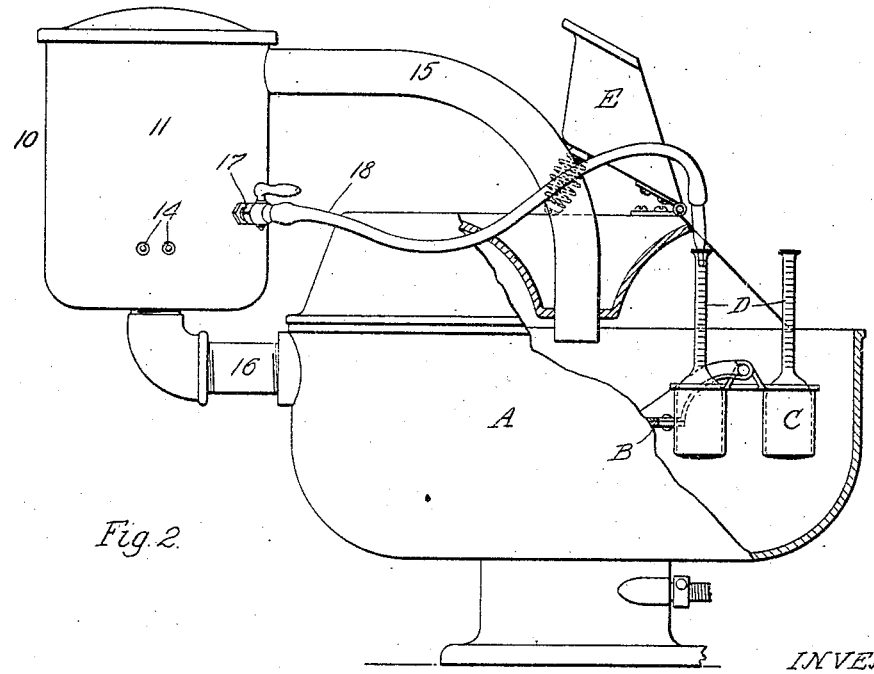
Fig. 2 is an elevation, partly in section thereof, illustrating how the hot water is delivered from the heater into the test bottles.

Referring first to Figs. 1 and 2, A represents the casing of the tester, and B the rotary carrier thereof provided with the usual swinging holders C for the test bottles or containers D. As usual, these bottles or containers have long graduated necks and when the machine is at rest the bottles are held upright by the swinging holders, as shown in Fig. 2. When the carrier is rotated the cups swing upwardly and hold the bottles with their necks extending inwardly or toward the axis of rotation of the carrier. The casing A is shown as being provided with the usual hinged or movable cover E adapted to be opened to afford access to the interior of the casing. F represents an electric motor suitably geared to the rotary carrier for driving it. The invention is not concerned with the construction of these parts of the machine and they may be of any usual or suitable construction. The rotary carrier can be driven by power in any other suitable way, or by hand.

10 represents a water and air heater which preferably comprises an outer casing 11, a water receptacle 12 located in the casing, and means for heating the water in this receptacle. In the construction shown in Figs. 1 and 2, an electric heating unit is provided in a chamber 13 within the casing 11 below the water receptacle. 14 represents the electrical terminals of this heating unit, which may be of any known or suitable type. The water receptacle 12 and the heating unit are suitably supported in the casing 11 so as to leave an air space in the casing around, and preferably under, the water receptacle and heating unit. The heater casing 11 is connected with the casing A of the tester so as to permit the circulation of air through the two casings. For instance, the upper portion of the heater casing 11 is connected by a pipe 15 to the central portion of the tester casing A and the peripheral portion of the tester casing A is connected by a pipe 16 to the bottom of the heater casing 11. The rotation of the bottle carrier and bottles in the casing A produces a fan action which causes a circulation of air from the upper portion of the heater casing 11 through the pipe 15 into the casing A and thence through the pipe 16 back to the lower portion of the heater casing 11. This circulating air is heated by the heating unit and the hot water in the heater casing 11 and the hot air and vapor from the water maintain the necessary temperature in the tester casing.

An electric water heater is desirable for testers which are driven by electrical motors or which are used in establishments where electricity is available for the water heater. Any other suitable construction of electric water heating device, such for instance as a plain cup with an electric immersion coil, could be employed for heating the water.

Preferably the water receptacle 12 is provided with a draw-off cock 17 to which is connected a flexible tube 18, and the water receptacle is located at such an elevation with reference to the tester that water can be discharged from the water receptacle 12 through the tube 18 into the test bottles without removing them from the tester, as indicated in Fig. 2. The draw-off cock is preferably located far enough above the bottom of the water receptacle to prevent the drawing off of all of the water and thus causing possible injury from the heat to the water heater.

Figure 3:
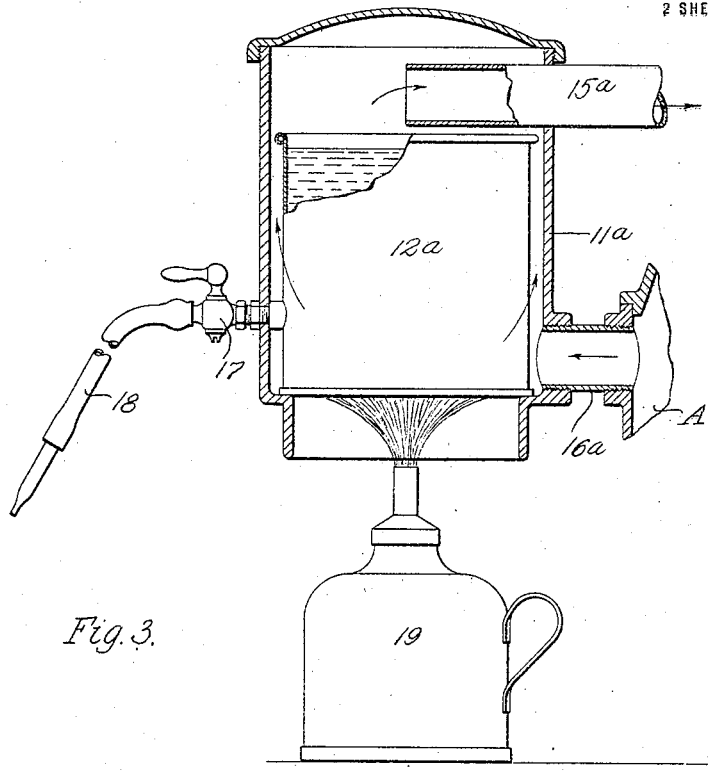
Fig. 3 is a sectional elevation showing a modified form of water heater.

Fig. 3 illustrates a construction of water heater which is suitable for use where electricity or steam are not available for heating the water. In this construction the water is heated by a lamp 19 located beneath the open bottom of the casing 11ª of the heater. The heater casing is connected to the tester casing A in a manner similar to that before explained, by means of upper and lower pipes 15ª and 16ª connecting respectively with the central and peripheral portions of the tester casing. In this construction, as in that above explained, the water receptacle 12ª is arranged to leave a space surrounding the same in the heater casing 11ª and the air is heated while circulating through the heater casing.

Figure 4:
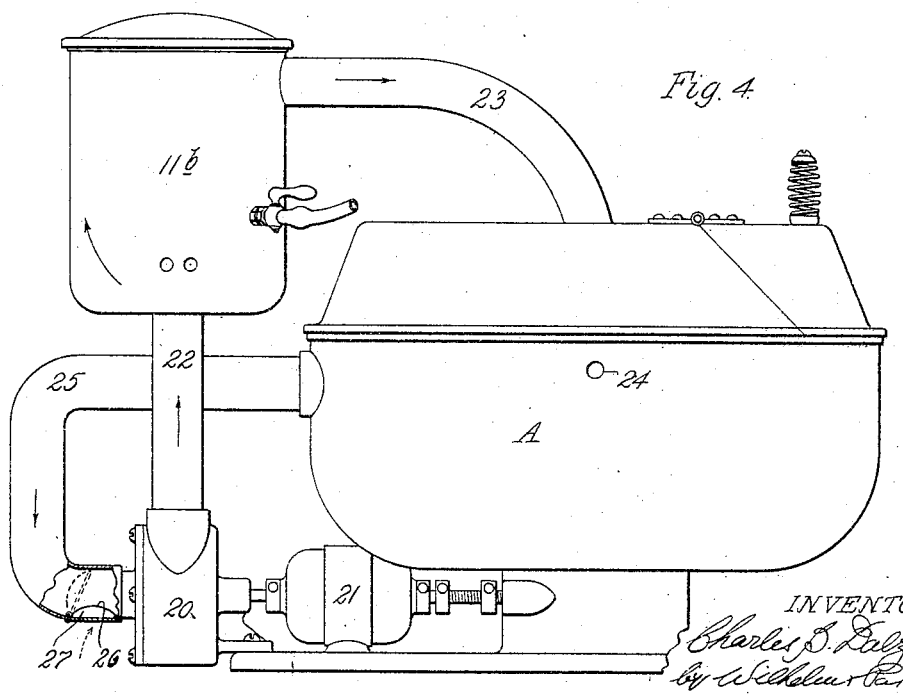
Fig. 4 is an elevation of another modification of the invention.

Fig. 4 shows a construction in which the circulation of the air through the heater casing 11ᵇ and through the tester casing is produced by means of a fan, which is indicated at 20. As shown, this fan is driven by the electric motor 21 which drives the rotary carrier of the tester, and the discharge pipe 22 of the fan connects with the bottom of the heater casing while the upper portion of the heater casing is connected by a pipe 23 with the central portion of the tester casing. The heater 11ᵇ may be constructed like that shown in Figs. 1 and 2, or may be of any other suitable construction. The fan causes a circulation of air through the heater casing, where it is heated, and thence through the tester casing which may have an opening 24 or other provision for the escape of the air so as to insure the proper circulation of the hot air through the tester casing. By the construction shown in Fig. 4, the fan is adapted either to take outside air through its inlet opening and deliver or easily applied by any one to the waistheater, to the tester casing, or if a more active circulation of the air is desired, to take the air from the tester casing. This may be accomplished by connecting the fan inlet with the peripheral portion of the tester casing by a pipe 25 provided with an air inlet opening 26 and a damper or valve 27 adapted to be turned so as to close either the pipe or the inlet opening. By turning this damper to the position shown by dotted lines, the fan will circulate outside air through the heater and tester casing, whereas by leaving the damper in the position shown by solid lines the fan will recirculate the air, drawing it from the tester casing and returning it through the heater to the tester casing.

In each of the embodiments of the invention illustrated the construction of the water and air heater is such that the vapor from the hot water passes with the heated air into the tester. In the practical use of the centrifuge the operator heats up the water before the tester is whirled, thereby storing in the water a quantity of heat which is carried in the form of vapor over into the tester case. Therefore, more heat is transferred to the case than would be possible by the circulation of air alone.

I claim as my invention:

1. The combination with the casing of a centrifugal tester in which a container for the material being tested is whirled, of a water heater, and means for supplying heated air and vapor from said water heater to said casing for heating the tester.

2. The combination with the casing of a centrifugal tester in which a container for the material being tested is whirled, of a water heater, and means for circulating air past said water heater and through said casing whereby the air is heated and the heated air and vapor from the water are supplied to the tester casing.

3. The combination with the casing of a centrifugal tester in which a container for the material being tested is whirled, of a water heater comprising a casing, a water receptacle therein, and means for heating the water, and means for circulating air through said heater and tester casings whereby the air is heated and heats the tester.

4. The combination with a centrifugal tester comprising a casing, and means for whirling therein a container for the material being tested, of an air heater, and a connection from said air heater to said casing whereby the fan action of said tester causes the delivery of air from said air heater into said casing for heating the tester.

5. The combination with a centrifugal tester comprising a casing, and means for whirling therein a container for the material being tested, of an air heater, and connections from said air heater to said casing whereby the fan action of said tester causes the circulation of air through said air heater and said casing and heats the tester.

6. The combination with a centrifugal tester comprising a casing, and means for whirling therein a container for the material being tested, of a water heater, and a connection from said water heater to said casing whereby the fan action of said tester causes the delivery of air heated by said water heater into said casing for heating the tester.

7. The combination with a centrifugal tester comprising a casing, and means for whirling therein a container for the material being tested, of a water heater comprising a casing, a water receptacle therein, and means for heating the water, and connections from said heater casing to said tester casing whereby the fan action of said tester causes the circulation of air through said heater and tester casings and the air is heated and heats the tester.

8. The combination with the casing of a centrifugal tester in which a container for the material being tested is whirled, of a water heater, means for supplying heated air from said water heater to said casing for heating the tester, and means for discharging water from said water heater into the container in the tester, said water heater being located at an elevation relative to the tester to enable the flow of water from the heater into the container.

9. The combination with a centrifugal tester comprising a casing, and means for whirling therein a container for the material being tested, of a water heater, and a connection from said water heater to said casing whereby the fan action of said tester causes the flow of air past said water heater and the delivery of heated air and vapor from the water into said casing for heating the tester.

10. The combination with a centrifugal tester comprising a casing, and means for whirling therein a container for the material being tested, of an air heater comprising a casing and means for heating air therein, an air connection from said heater casing to the central part of said tester casing, and an air connection from the peripheral portion of the tester casing to the heater casing whereby the fan action of said tester causes the circulation of air through said casings and the heating of the tester.

Witness my hand, this 23rd day of October, 1918.

CHARLES B. DALZELL.

Witnesses:
L. M. GRAVES,
H. C. MILLER.